United States Patent [19]

Brede et al.

[11] Patent Number: 5,466,313
[45] Date of Patent: Nov. 14, 1995

[54] GAS-PRODUCING MATERIAL

[75] Inventors: Uwe Brede, Fürth; Rainer Hagel, Erlangen; Klaus Redecker, Nürnberg, all of Germany

[73] Assignee: Dynamit Nobel Aktiengesellschaft, Troisdorf, Germany

[21] Appl. No.: 192,283

[22] Filed: Feb. 4, 1994

[30] Foreign Application Priority Data

Feb. 4, 1993 [DE] Germany .......................... 43 03 169.2

[51] Int. Cl.$^6$ .................................................. C06B 47/00
[52] U.S. Cl. .................................................................. 149/1
[58] Field of Search ...................................................... 149/1

[56] References Cited

U.S. PATENT DOCUMENTS 3,273,348 9/1966 Hart ............................................. 149/1
4,679,706 7/1987 Magid ...................................... 222/130
5,330,730 7/1994 Brede ...................................... 422/305

OTHER PUBLICATIONS

B. Kit, et al "Rocket Propellant Handbook" 1960, The MacMillan Company, New York, USA considered.

*Primary Examiner*—Ngoclan Mai
*Assistant Examiner*—Anthony R. Chi
*Attorney, Agent, or Firm*—Antonelli, Terry, Stout & Kraus

[57] ABSTRACT

A gas-producing material for a gas generator, particularly for a belt tightener or for an inflatable impact cushion (airbag) to protect motor vehicle occupants, containing a liquefied gas mixture in which the liquefied gas components consist of a mixture of one or more ethers, olefins, ammonia or hydrogen and nitrous oxide ($N_2O$).

22 Claims, No Drawings

GAS-PRODUCING MATERIAL

FIELD OF INVENTION

This invention relates to a gas-producing material for a gas generator, particularly for a safety belt tightener or for an inflatable impact cushion to protect a motor vehicle occupant from injury, the gas-producing material comprising a liquefied gas mixture.

BACKGROUND OF THE INVENTION

A propellent charge in tablet or disc form is used as the combustible gas-producing material in the gas generators currently used for inflatable impact cushions (also called "airbags"). On combustion this charge generates the utilizable or compressed gas to inflate the impact cushion. Generally speaking, the disadvantage involved in the combustion of solid gas-producing materials lies in the very high proportion of slag which arises on combustion, and accounts for more than 50% of the propellent charge composition that is used. Because of the slag and dust that are formed on combustion, complex filter stages are required in the gas generator in order to retain slag and dust particles. Otherwise, if these particles escaped the impact cushion could be damaged and the occupants put at risk.

Gas generators with compressed gases or air are available as an alternative to generators containing combustible solids. Very high boost pressures are required to form a sufficient volume of gas, as cooling takes place when the gases escape and no gain in volume is achieved by exothermic reaction as in the case of solid mixtures.

SUMMARY OF THE INVENTION

An object of this invention is to make available a gas-producing material for a gas generator, particularly for a belt tightener or for an inflatable impact cushion (e.g., airbag) to protect a motor vehicle passenger from injury, in which slag retaining devices are not required. Liquefied gas, which reaches a combustion chamber in a controlled manner and burns on ignition in the chamber, should be used as the gas-producing material.

This object is achieved in that the gas-producing material is a liquefied gas comprising a mixture of one or several fuels and an oxidizing agent, the liquefied gas being a material that is in the gaseous state under normal conditions (room temperature and normal, i.e. atmospheric, pressure) and is liquefied because of the pressure it is under in the storage chamber. This pressurized liquefied gas is sprayed into the combustion chamber of the gas generator adjacent to the storage chamber in a controlled manner. Shortly before and/or as the liquefied gas mixture enters the combustion chamber, an ignition device with an ignition charge is ignited. An exploding wire or a particle-rich, hot flame, for example, can be used as the ignition charge. The ignition fumes and hot combustion gases ignite the liquefied gas mixture which vaporizes and/or volatilizes because of the expansion taking place in the combustion chamber. The combustible liquefied gas mixture burns in the combustion chamber without leaving solid particles behind. When the liquefied gas mixture according to the invention is used, filter stages upstream of the at least one outlet opening of the gas generator housing wall can therefore be dispensed with. Insofar as filter stages are provided, they are exclusively for cooling purposes. Cooling can, however, also be effected in another way, in that a distributor chamber of the housing, from which the combustion gases reach the outside via the at least one outlet opening, can be located downstream of the combustion chamber.

DETAILED DESCRIPTION OF THE INVENTION

The invention proposes gas mixtures with a low boost pressure which, on burning, cause the volume to multiply as a result of exothermy and require no filters at all. The liquefied gas mixture that can be used according to the invention comprises a fuel portion and the oxidizing agent. To prevent high boost pressures, oxygen or air are not used as an oxidizing agent. Nitrous oxide (laughing gas) is a gas which can easily be liquefied (critical pressure: 72.7 bars, critical temperature: 36.4° C.). The oxidizing capacity is twice that of air and, in contrast, to pure oxygen or air, laughing gas behaves as an inert gas up to at least 200° C., so that quiescent oxidation processes are prevented with high-temperature storage too.

The fuel portion consists of one or several ethers or olefins, ammonia or hydrogen or mixtures of these constituents.

In the context of the invention, ethers selected from the group consisting of dimethyl ether and ethylmethyl ether and mixtures thereof are preferably used. A particularly preferred ether in the context of the present invention is dimethyl ether.

In the context of the invention, low-boiling olefins, such as ethylene and propylene and their mixtures are preferably used as the olefins. The olefin particularly preferred is ethylene.

The ignition capacity of the mixtures according to the invention covers a wide range. For example, mixtures of between 97.5% by weight of nitrous oxide and 2.5% by weight of fuel and 70% by weight of nitrous oxide and 30% by weight of fuel can be ignited extraordinarily well. If ammonia is used as the fuel, for example, the proportion of ammonia can amount to 14 to 75 parts by weight and the proportion of nitrous oxide 25 to 86 parts by weight. The thermal stability of the mixtures according to the invention meets all the requirements of the automobile industry. The storage stability of the propellants according to the invention has been established at >105° C.

The weight ratio of fuels to nitrous oxide is preferably set in such a way that a non-combustible gas mixture is produced after the combustion reaction. Accordingly, the weight ratio of the fuels to the nitrous oxide should be adapted to the stoichiometric conditions of a complete (as far as possible) combustion. Advantageously, therefore, nitrous oxide is used in a slight excess with respect to the fuel. In this case the reaction products essentially comprise gaseous substances ($CO_2$, $H_2O$ and $N_2$ as well as potential residues of the components). A special advantage of the use of ammonia or hydrogen as fuel lies in the fact that only $N_2$ and $H_2O$ are formed as reaction products. A particularly suitable mixing ratio for the components dimethyl ether and nitrous oxide consists of a weight ratio of dimethyl ether to nitrous oxide of 12:88 parts by weight, for the components ethylene and nitrous oxide a weight ratio of ethylene to nitrous oxide of 10:90 parts by weight, for the components ammonia and nitrous oxide a weight ratio of ammonia to nitrous oxide of 15:85 parts by weight, for the components hydrogen and nitrous oxide a weight ratio of hydrogen to nitrous oxide of 4.3:95.7 parts by weight. Nitrous oxide acts here as an oxygen donor.

Surprisingly, particularly with relatively high charge masses in liquefied gas generators, the reaction rate can be controlled within wide limits by the addition of inert gases, particularly physiologically harmless gases with a low intrinsic pressure. Particularly preferred, therefore, is an inert gas selected from carbon dioxide or xenon or their mixtures. Such inert gases can preferably be used in a quantity of 10 to 80% by weight, related to the mixture of the fuel portion and the nitrous oxide. As is known, carbon dioxide can be condensed just as easily as nitrous oxide (critical pressure: 73.8 bars, critical temperature: 31.0 ° C.). In the context of the invention the inert gas, particularly the carbon dioxide, acts as a reaction moderator. Carbon dioxide has, moreover, essentially more suitable properties than, for example, nitrogen and other inert gases, the use of which should not, however, be excluded. Particularly when using the fuels ammonia or hydrogen, xenon as the inert gas offers the advantage that only $N_2$ and $H_2O$ are produced as reaction products.

According to the invention, the liquefied gas mixture is composed of 14 to 87.75% by weight of nitrous oxide, 0.5 to 27% by weight of fuel and, if required, 10 to 80% by weight of inert gas. More specifically, the following compositions can be used according to the invention, for example:

| Composition I: | |
| --- | --- |
| Nitrous oxide | 90% by weight |
| Fuel (e.g. ethene) | 10% by weight |
| Composition II: | |
| Nitrous oxide | 85% by weight |
| Fuel (e.g. ammonia) | 15% by weight |
| Composition III: | |
| Nitrous oxide | 70% by weight |
| Fuel (e.g. dimethyl ether) | 30% by weight |
| Composition IV: | |
| Nitrous oxide | 97.5% by weight |
| Fuel (e.g. hydrogen) | 2.5% by weight |
| Composition V: | |
| Nitrous oxide | 14% by weight |
| Fuel (e.g. propene) | 6% by weight |
| Inert gas (e.g. carbon dioxide) | 80% by weight |
| Composition VI: | |
| Nitrous oxide | 59.4% by weight |
| Fuel (e.g. ethyl methyl ether) | 6.6% by weight |
| Inert gas (e.g. nitrogen) | 34% by weight |
| Composition VII: | |
| Nitrous oxide | 19.5% by weight |
| Fuel (e.g. ethene) | 0.5% by weight |
| Inert gas (e.g. carbon dioxide) | 80% by weight |
| Composition VIII: | |
| Nitrous oxide | 87.75% by weight |
| Fuel (e.g. propene) | 2.25% by weight |
| Inert gas (e.g. nitrogen) | 10% by weight |
| Composition IX: | |
| Nitrous oxide | 63% by weight |
| Fuel (e.g. dimethyl ether) | 27% by weight |
| Inert gas (e.g. carbon dioxide) | 10% by weight |
| Composition X: | |
| Nitrous oxide | 44% by weight |
| Fuel (e.g. dimethyl ether) | 6% by weight |
| Inert gas (e.g. carbon dioxide) | 50% by weight |
| Composition XI: | |
| Nitrous oxide | 45% by weight |
| Fuel (e.g. ethene) | 5% by weight |
| Inert gas (e.g. carbon dioxide) | 50% by weight |
| Composition XII: | |
| Nitrous oxide | 28.7% by weight |
| Fuel (e.g. hydrogen) | 1.3% by weight |
| Inert gas (e.g. carbon dioxide or xenon) | 70.0% by weight |

These particulars are intended to describe the invention in greater detail but without restricting its scope.

The explosion temperature of the mixtures according to the invention is approx. 3000° C. and decreases, the greater the proportion of inert gas. A volume potentiation thus takes place on reaction. The kinetics can be adapted to the system in question, the particular airbag system in question, for example, by varying the quantity, particularly of the reaction moderator.

Should it be necessary to depart from the stoichiometric ratio in specific applications, a further catalytic reaction, by means of a catalyst comprising a suitable material in the form of a through-flow screen, for example, can be arranged to reduce the gas content.

To control the emissions characteristic curve ($CO-NO_x$ equilibrium), the reacting gases can be brought into contact in the combustion chamber or in a diffuser with thin, preferably electrolytically produced layers of metals or alloys of the platinum series.

The Examples hereinafter described substantiate the applicability of the mixtures according to the invention. The propellants are tested in a test device which is like a gas generator in terms of construction, having a downstream canister with an igniter which is customary for propellants for gas generators.

EXAMPLE 1

2.5 g of a mixture of 90% by weight of nitrous oxide and 10% by weight of dimethyl ether are condensed in a commercially available nitrous oxide cartridge of 10 ml capacity, for example, of the kind suitable for dispensing cream, after the nitrous oxide has been discharged. This mixture was ignited by means of an ignition charge for example by means of an exploding wire. Because of the high explosion temperature, a volume potentiation takes place. The gas being produced is suitable, for example, for filling an airbag.

EXAMPLE 2

This example is intended to demonstrate the stability of the mixtures according to the invention. A commercially available No. 8 detonator which was fitted to the cartridge filled as described in Example 1 perforated the cartridge wall and ignited the mixture, breaking the cartridge up into small pieces. A filling of nitrous oxide alone did not destroy the cartridge on detonation. If a layer of common commercial insulating tape was placed round the cartridge and the detonator was then attached, the cartridge was only severely dented, but not perforated and the gas mixture did not ignite.

The gas mixture therefore even withstood the detonation impact of a detonator.

EXAMPLE 3

A mixture of 50% by weight of carbon dioxide, 44% by weight of nitrous oxide and 6% by weight of dimethyl ether meets the pressure/time requirements for airbag generators on combustion.

EXAMPLE 4

A mixture of 50% by weight of carbon dioxide, 45% by weight of nitrous oxide and 5% by weight of ethene meets the pressure/time requirements for airbag generators on combustion.

EXAMPLE 5

A mixture of 70% by weight of carbon dioxide or xenon, 28.7% by weight of nitrous oxide and 1.3% by weight of hydrogen has a pressure of approx. 50 bars at room temperature with a charge density of 0.3 g/ml. The combustion behavior corresponds to that of the organic/inorganic compositions. On combustion the mixture meets the pressure/time requirements for airbag generators. Only $N_2$ and $H_2O$ were produced as reaction products when xenon was used as the inert gas.

What is claimed is:

1. A gas-producing material for a gas generator for use with an airbag of a vehicle, which comprises a liquefied gas mixture capable of forming an ignitable gas mixture, said liquefied gas mixture comprising nitrous oxide and at least one fuel selected from the group consisting of ethers, olefins, ammonia and hydrogen in proportions that provide the ignitable gas mixture.

2. A gas-producing material according to claim 1, wherein the at least one fuel is selected from dimethyl ether, ethylmethyl ether and mixtures thereof, from low-boiling olefins including ethylene, propylene and mixtures thereof, from ammonia or from hydrogen.

3. A gas-producing material according to claim 1, wherein said liquefied gas mixture of fuel and nitrous oxide contains between 97.5% by weight of nitrous oxide and 2.5% by weight of the at least one fuel and 30% by weight of nitrous oxide and 70% by weight of the at least one fuel.

4. A gas-producing material according to claim 2, wherein said liquefied gas mixture of fuel and nitrous oxide contains between 97.5% by weight of nitrous oxide and 2.5% by weight of the at least one fuel and 30% by weight of nitrous oxide and 70% by weight of the at least one fuel.

5. A gas-producing material according to claim 1, wherein the weight ratio of the at least one fuel to nitrous oxide is set to the stoichiometric conditions for a complete combustion of the fuel.

6. A gas-producing material for a gas generator, which comprises a liquefied gas mixture of nitrous oxide and at least one gaseous fuel, wherein the at least one fuel is selected from dimethyl ether, ethyl methyl ether and mixtures thereof from low-boiling olefins including ethylene, propylene and mixtures thereof, from ammonia or from hydrogen and wherein the weight ratio of fuel to nitrous oxide is set to the stoichiometric conditions for a complete combustion of the fuel.

7. A gas-producing material according to claim 2, wherein the weight ratio of dimethyl ether to nitrous oxide is 12:88 parts by weight, the weight ratio of ethylene to nitrous oxide 10:90 parts by weight, the weight ratio of ammonia to nitrous oxide 15:85 parts by weight or the weight ratio of hydrogen to nitrous oxide 4.3:95.7 parts by weight.

8. A gas-producing material according to claim 1, wherein the liquefied gas mixture also contains, in addition to the at least one fuel and the nitrous oxide, an inert gas, particularly an inert gas with a low intrinsic pressure.

9. A gas-producing material according to claim 8, wherein the inert gas is carbon dioxide and/or xenon, in a quantity from 10 to 80% by weight, related to the liquefied gas mixture of fuel and nitrous oxide.

10. A process for generating utilizable or compressed gas, characterized in that a gas-producing material according to claim 1 is ignited by an igniter in a gas generator.

11. A process for generating utilizable or compressed gas, characterized in that a gas-producing material comprising a liquefied gas mixture of nitrous oxide and at least one fuel selected from the group consisting of ethers, olefins, ammonia and hydrogen is ignited by an igniter in a gas generator and wherein the reacting gases are brought into contact with thin layers produced electrolytically of metals or alloys of the platinum series.

12. A gas-producing material according to claim 1, wherein said liquefied gas mixture consists of nitrous oxide and ethene.

13. A gas-producing material according to claim 1, wherein said liquefied gas mixture consists of nitrous oxide and ammonia.

14. A gas-producing material according to claim 1, wherein said liquefied gas mixture consists of nitrous oxide and dimethyl ether.

15. A gas-producing material according to claim 1, wherein said liquefied gas mixture consists of nitrous oxide and hydrogen.

16. A gas-producing material according to claim 1, wherein said liquefied gas mixture consists of nitrous oxide, propene and carbon dioxide.

17. A gas-producing material according to claim 1, wherein said liquefied gas mixture consists of nitrous oxide, ethyl methyl ether and nitrogen.

18. A gas-producing material according to claim 1, wherein said liquefied gas mixture consists of nitrous oxide, ethene and carbon dioxide.

19. A gas-producing material according to claim 1, wherein said liquefied gas mixture consists of nitrous oxide, propene and nitrogen.

20. A gas-producing material according to claim 1, wherein said liquefied gas mixture consists of nitrous oxide, dimethyl ether and carbon dioxide.

21. A gas-producing material according to claim 1, wherein said liquefied gas mixture consists of nitrous oxide, hydrogen and carbon dioxide or xenon.

22. A gas-producing material according to claim 1, wherein the gas-producing material consists of the liquefied gas mixture and said liquefied gas mixture contains up to 80% by weight of an inert gas selected from the group consisting of carbon dioxide, xenon, nitrogen and mixtures thereof.

* * * * *